(12) United States Patent
Gossack

(10) Patent No.: US 10,364,917 B2
(45) Date of Patent: Jul. 30, 2019

(54) APPARATUS FOR SECURING A ROAD TUBE

(71) Applicant: TMARK, INC., Salem, OR (US)

(72) Inventor: Daniel Gossack, Salem, OR (US)

(73) Assignee: TMARK, INC., Salem, OR (US)

( * ) Notice: Subject to any disclaimer, the term of this patent is extended or adjusted under 35 U.S.C. 154(b) by 0 days.

(21) Appl. No.: 15/944,671

(22) Filed: Apr. 3, 2018

(65) Prior Publication Data
US 2018/0292028 A1 Oct. 11, 2018

Related U.S. Application Data

(60) Provisional application No. 62/480,721, filed on Apr. 3, 2017.

(51) Int. Cl.
| | |
|---|---|
| F16L 3/10 | (2006.01) |
| F16M 13/02 | (2006.01) |
| E01F 11/00 | (2006.01) |
| G08G 1/01 | (2006.01) |
| G08G 1/02 | (2006.01) |

(52) U.S. Cl.
CPC .............. *F16L 3/10* (2013.01); *E01F 11/00* (2013.01); *F16M 13/02* (2013.01); *G08G 1/0133* (2013.01); *G08G 1/02* (2013.01)

(58) Field of Classification Search
CPC . F16L 3/10; E01F 11/00; F16M 13/02; G08G 1/02; G08G 1/0133
USPC ........ 248/75, 85, 87; 404/9–16; 340/33–943
See application file for complete search history.

(56) References Cited

U.S. PATENT DOCUMENTS

| | | | |
|---|---|---|---|
| 1,927,756 A * | 9/1933 | Ross ....................... | E01F 9/553 |
| | | | 404/16 |
| 2,334,143 A | 11/1943 | Basquin et al. | |
| 3,427,933 A * | 2/1969 | Taylor-Myers ......... | E01C 23/18 |
| | | | 29/238 |
| 3,587,416 A | 6/1971 | Flanagan | |
| 3,699,398 A | 10/1972 | Newmeyer | |
| 3,911,390 A | 10/1975 | Myers | |
| 3,949,355 A | 4/1976 | Newmeyer | |
| 3,950,725 A | 4/1976 | Kitajima | |
| 4,004,766 A * | 1/1977 | Long ........................ | F16L 3/10 |
| | | | 248/55 |
| 4,050,834 A | 9/1977 | Lee | |
| 4,862,163 A | 8/1989 | Sobut | |
| 4,901,334 A * | 2/1990 | Gibson ................... | E01F 11/00 |
| | | | 340/940 |
| 5,267,367 A * | 12/1993 | Wegmann, Jr. ........ | A62C 33/06 |
| | | | 14/69.5 |

(Continued)

*Primary Examiner* — Muhammad Ijaz
(74) *Attorney, Agent, or Firm* — Chernoff Vilhauer LLP

(57) ABSTRACT

An apparatus for securing a road tube to a roadway is disclosed. The apparatus may comprise a locking component configured to engage a portion of the road tube. The apparatus may additionally comprise a base assembly configured to be secured to the roadway. The base assembly may include a planar base, a first side portion extending from the base, and a second side portion extending from the base. The first and second side portions may define a channel therebetween. The channel may be configured to receive the locking component. As the locking component is moved into the channel, at least one of the first and second side portions may be configured to move the locking component toward the base to secure the portion of the road tube therebetween.

17 Claims, 4 Drawing Sheets

(56) References Cited

U.S. PATENT DOCUMENTS

| | | |
|---|---|---|
| 5,477,217 A | 12/1995 | Bergan |
| 5,548,275 A | 8/1996 | Shambayati et al. |
| 5,748,108 A | 5/1998 | Sampey et al. |
| 5,752,215 A | 5/1998 | Zaaiman et al. |
| 5,808,562 A | 9/1998 | Bailleul et al. |
| 6,079,898 A * | 6/2000 | St. Amant, III ....... A62C 33/06 404/6 |
| 6,387,076 B1 * | 5/2002 | Landuyt ................ A61M 25/02 128/DIG. 6 |
| 6,744,378 B1 * | 6/2004 | Tyburski ................ E01F 11/00 200/86 A |
| 6,917,308 B2 | 7/2005 | Hilliard |
| 8,342,211 B2 * | 1/2013 | King ........................ F16L 3/04 104/275 |
| 2005/0238425 A1 * | 10/2005 | Safar ...................... E01F 9/559 404/16 |
| 2007/0013554 A1 * | 1/2007 | Tyburski ................ E01F 11/00 340/933 |
| 2015/0161887 A1 * | 6/2015 | Buschmann ......... H03K 17/955 340/941 |
| 2015/0285404 A1 * | 10/2015 | Koyama ................ F04B 43/12 248/74.2 |
| 2018/0292028 A1 * | 10/2018 | Gossack ................... F16L 3/10 |
| 2018/0309276 A1 * | 10/2018 | Dietz ................... H02G 3/0456 |

\* cited by examiner

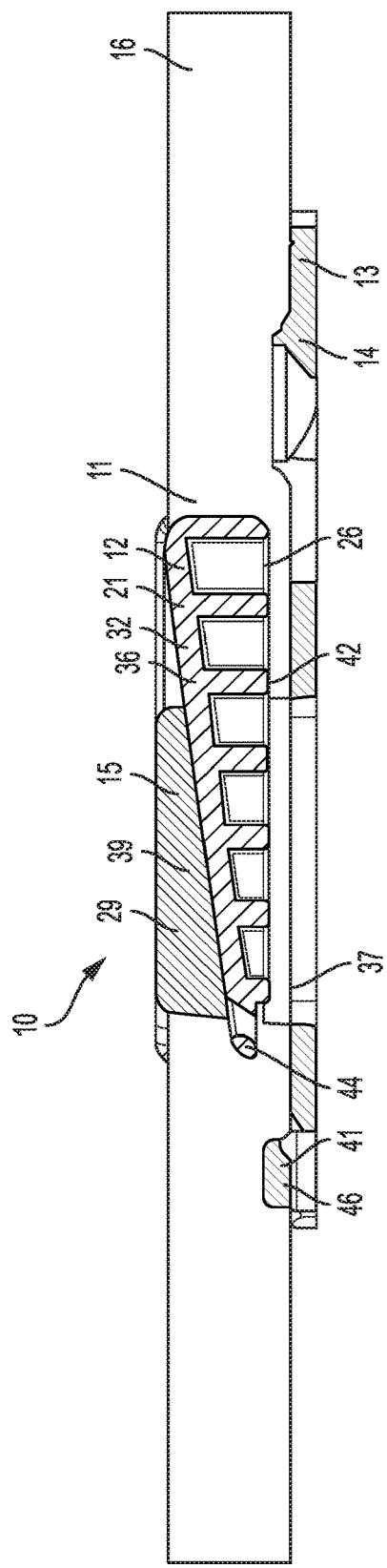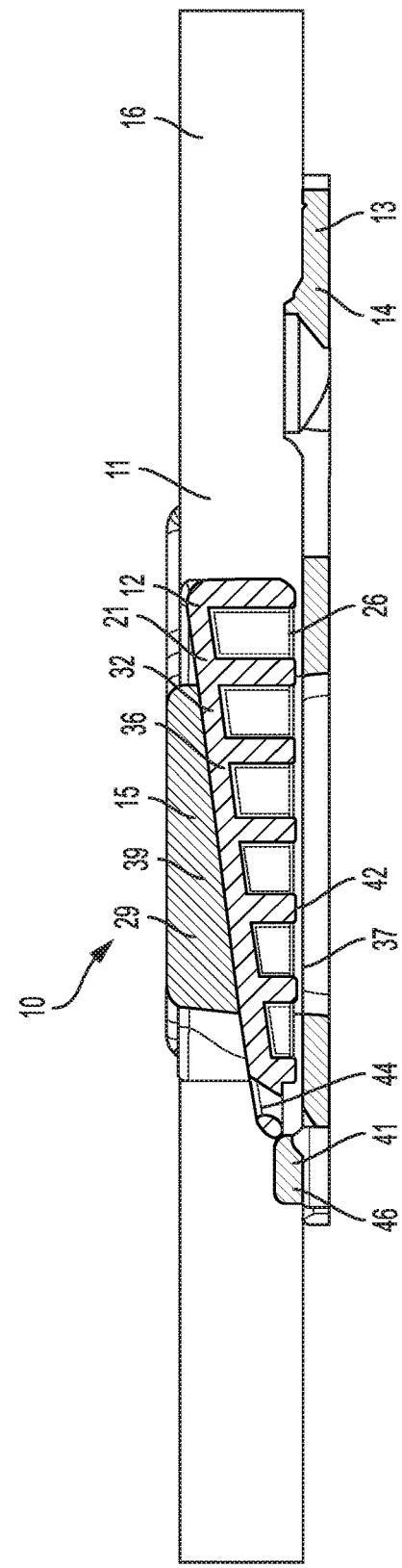

APPARATUS FOR SECURING A ROAD TUBE

CROSS-REFERENCE TO RELATED APPLICATIONS

This application claims the benefit of U.S. Provisional Patent Application Ser. No. 62/480,721, which was filed on Apr. 3, 2017 and entitled "Apparatus For Securing A Road Tube." The complete disclosure of the above application is hereby incorporated by reference for all purposes.

TECHNICAL FIELD

The present disclosure relates to traffic monitoring sensors, and more particularly to apparatus for securing road tubes used by traffic monitoring sensors.

BACKGROUND

The collection of traffic data is required for analysis of traffic flow, for traffic-related law enforcement, for evaluating road wear, and for infrastructure planning. While sophisticated methods for collecting traffic-flow data may exist, such as radar tracking and image capture and processing, many traffic monitors continue to employ a road tube as a sensor.

A road tube is a flexible hollow tube that is secured across a roadway. By closing one end of the tube and connecting the other end to a pressure sensor, the pressure pulse created by a vehicle crossing the tube may be read by a counter mechanism. Although such monitoring sensors are reliable and robust, to remain operational, the road tube must remain intact and securely attached in place, despite being driven over by a large number of vehicles.

SUMMARY

The present disclosure provides systems, apparatuses, and methods relating to a mounting apparatus for a road tube. In some embodiments, an apparatus for securing a road tube to a roadway may comprise a locking component configured to engage a portion of the road tube. The apparatus may additionally comprise a base assembly configured to be secured to the roadway. The base assembly may include a planar base, a first side portion extending from the base, and a second side portion extending from the base. The first and second side portions may define a channel therebetween. The channel may be configured to receive the locking component. As the locking component is moved into the channel, at least one of the first and second side portions may be configured to move the locking component toward the base to secure the portion of the road tube therebetween.

In some embodiments, an apparatus for securing a road tube to a roadway may comprise a locking component configured to engage a portion of the road tube. The locking component may include a main portion disposed between third and fourth side portions. The main portion may include spaced-apart first and second walls. The first and second walls may be parallel to each other and each of the first and second walls may include an end. The locking component may further include a third wall connecting the ends of the first and second walls. The first, second, and third walls may define a cavity that is configured to receive the portion of the road tube.

The apparatus may additionally comprise a base assembly configured to be secured to the roadway. The base assembly may include a planar base, a first side portion extending from the base, and a second side portion extending from the base. The first and second side portions may define a channel therebetween. The channel may be configured to receive the locking component. As the locking component is moved into the channel, at least one of the first and second side portions may be configured to move the locking component toward the base to secure the portion of the road tube therebetween.

The first and second portions of the base assembly may include first and second inverted inclined surfaces, respectively. The third and fourth side portions of the locking component may include third and fourth inclined surfaces, respectively. The first inverted inclined surface may be configured to contact the third inclined surface, and the second inverted inclined surface may be configured to contact the fourth inclined surface when the locking component is received in the channel such that, as the locking component is moved into the channel, the first and second inverted inclined surfaces move the locking component toward the base to secure the portion of the road tube therebetween.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 6 is a side view of the mounting apparatus of FIG. 5 showing the locking component received within a channel of the base assembly in accordance with aspects of the present disclosure.

FIG. 7 is the side view of FIG. 6 showing the locking component received further within the channel and contacting the base assembly in accordance with aspects of the present disclosure.

DETAILED DESCRIPTION

Various aspects and examples of a road tube mounting apparatus having a locking component and a base assembly, as well as related methods, are described below and illustrated in the associated drawings. Unless otherwise specified, a road tube mounting apparatus in accordance with the present teachings, and/or its various components may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

In general, a road tube mounting apparatus in accordance with the present teachings may include a locking component and a base assembly. The locking component has a front end portion and a rear end portion and at least one inclined surface that increases in height from front to back, and at least a portion of the underside of the locking component is configured to engage a portion of the road tube. The base assembly is configured to be secured to a roadway, and defines a channel configured to secure the locking component atop the road tube in the channel. The channel includes an inverted inclined surface that is complementary to and configured to engage with the inclined surface of the locking component, so that forward movement of the locking component within the channel urges the locking component downward to compress and more securely retain the road tube between the underside of the locking component and a floor of the base assembly.

Figure 1:
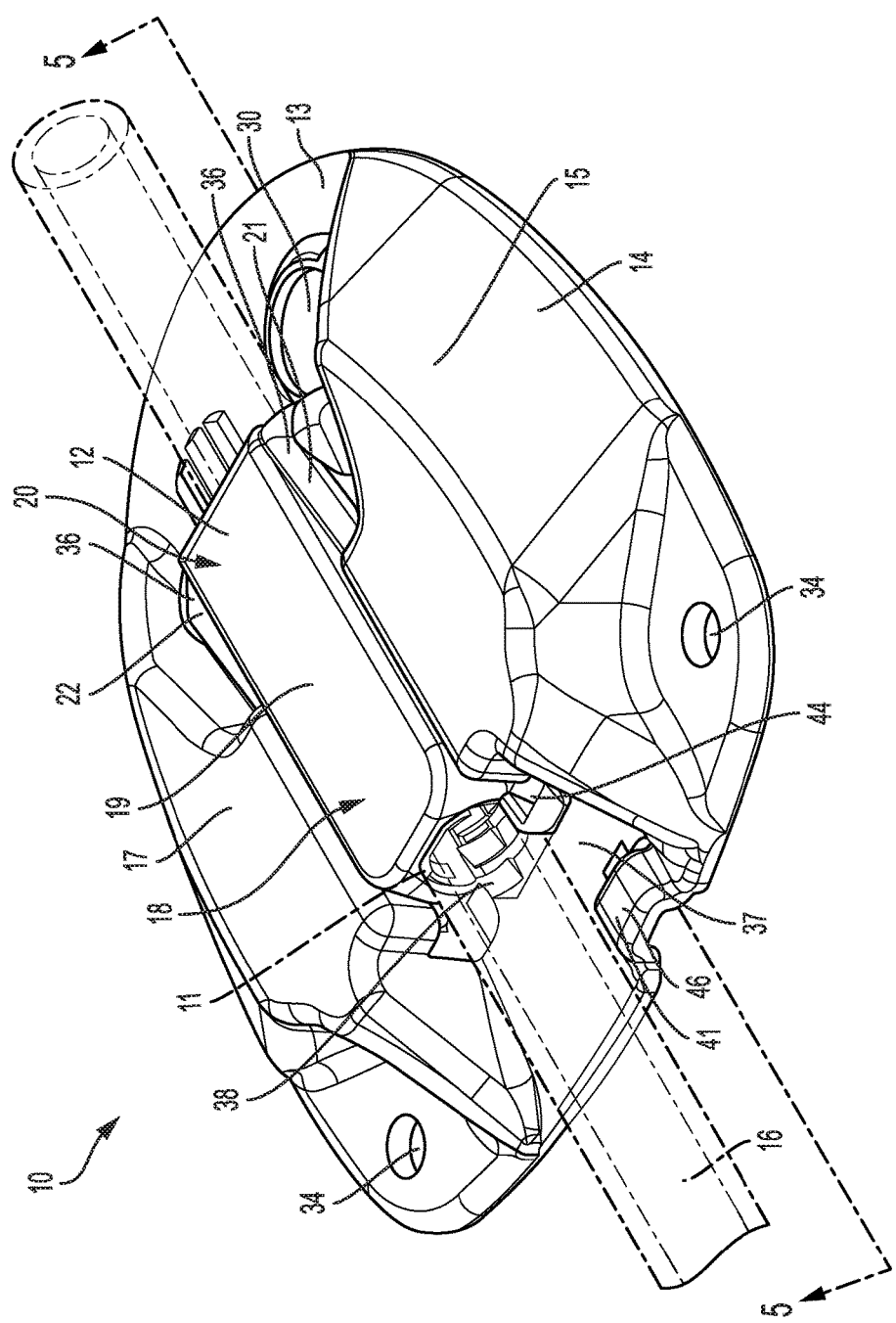
FIG. 1 is an isometric view of an illustrative mounting apparatus securing a road tube in accordance with aspects of the present disclosure.
Figure 2:
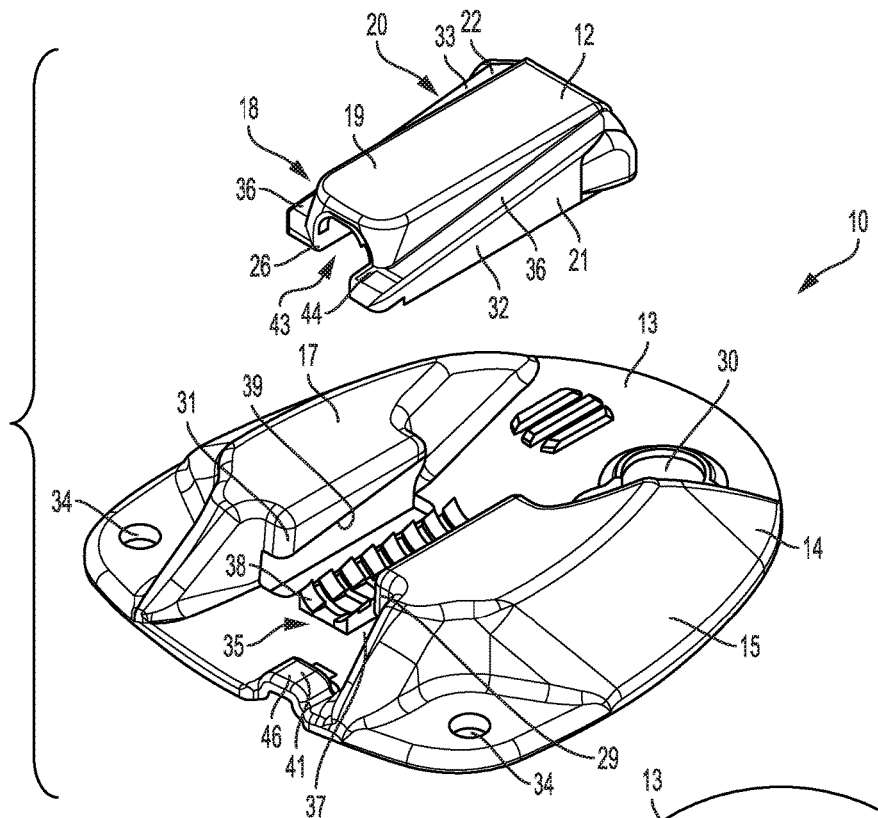
FIG. 2 is an isometric view of the mounting apparatus of FIG. 1 shown with a locking component separated from a base assembly in accordance with aspects of the present disclosure.

A road tube mounting apparatus 10 according to the present disclosure is shown in FIGS. 1 and 2. As shown, mounting apparatus 10 includes a locking component 12 and a base assembly 14. Base assembly 14 is configured to be secured to a surface, such as a roadway, and is further configured to cooperate with locking component 12 to secure a road tube 16 (shown in dashed lines in FIG. 1). Locking component 12 may be referred to as a wedge, wedge component, or locking element, and is configured to engage a portion 11 of road tube 16. In some examples, locking component 12 is wedge-shaped. However, locking component 12 may be any suitable shape or combination of shapes.

Figure 3:
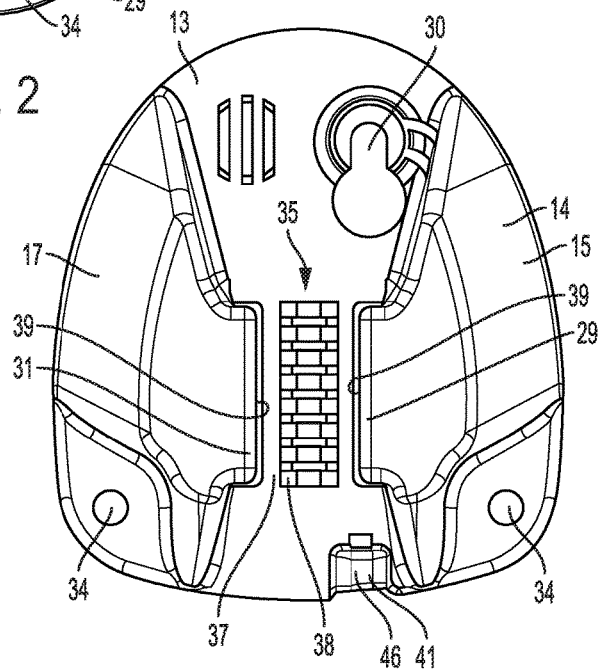
FIG. 3 is a top plan view of the base assembly of FIG. 1 in accordance with aspects of the present disclosure.

FIG. 3 is a top view of base assembly 14. Base assembly 14 may also be referred to as a base component. Base assembly 14 includes a planar base 13, a first side portion 15 extending from planar base 13, and a second side portion 17 extending from planar base 13. Planar base 13 may also be referred to as a base. Planar base 13 further includes a floor 37 such that floor 37, first side portion 15, and second side portion 17 define a channel 35. Channel 35 is configured to receive locking component 12 and, as locking component 12 is moved into channel 35, at least one of the first and second side portions is configured to move locking component 12 toward base 13 to secure portion 11 of road tube 16 between the locking component and the base. In some examples, first side portion 15 and second side portion 17 are incorporated or formed with base 13.

In other words, base assembly 14 defines a channel 35 that may be configured to receive road tube 16. Channel 35 may extend substantially from front to back of base assembly 14, and be sized and shaped such that road tube 16 may rest in channel 35. Additionally, base assembly 14 may be configured so that locking component 12 may be secured atop road tube 16 in channel 35.

Base assembly 14 may be configured to be secured to a surface, such as a road surface. It should be appreciated that base assembly 14 may be secured to any surface that facilitates the appropriate placement of road tube 16 where the desired traffic data may be recorded. As best seen in FIG. 3, base assembly 14 may include an aperture 30 that is configured to receive a fastener, such as a nail, for example a masonry nail. Any fastener that is suitable for securing base assembly 14 to the desired surface is an appropriate fastener for the purposes of this disclosure, including nails, spikes, screws, and the like. In other words, base 13 includes an aperture 30 sized to receive a fastener to secure base assembly 14 to the roadway When secured by a nail as a single fastener, base assembly 14 may be permitted to pivot around the nail as road tube 16 is moved, thereby preventing kinks in the road tube as it exits base assembly 14. Alternatively, additional fasteners may be used in conjunction with apertures 34 to more securely mount the base assembly 14 to the desired surface.

Figure 4:
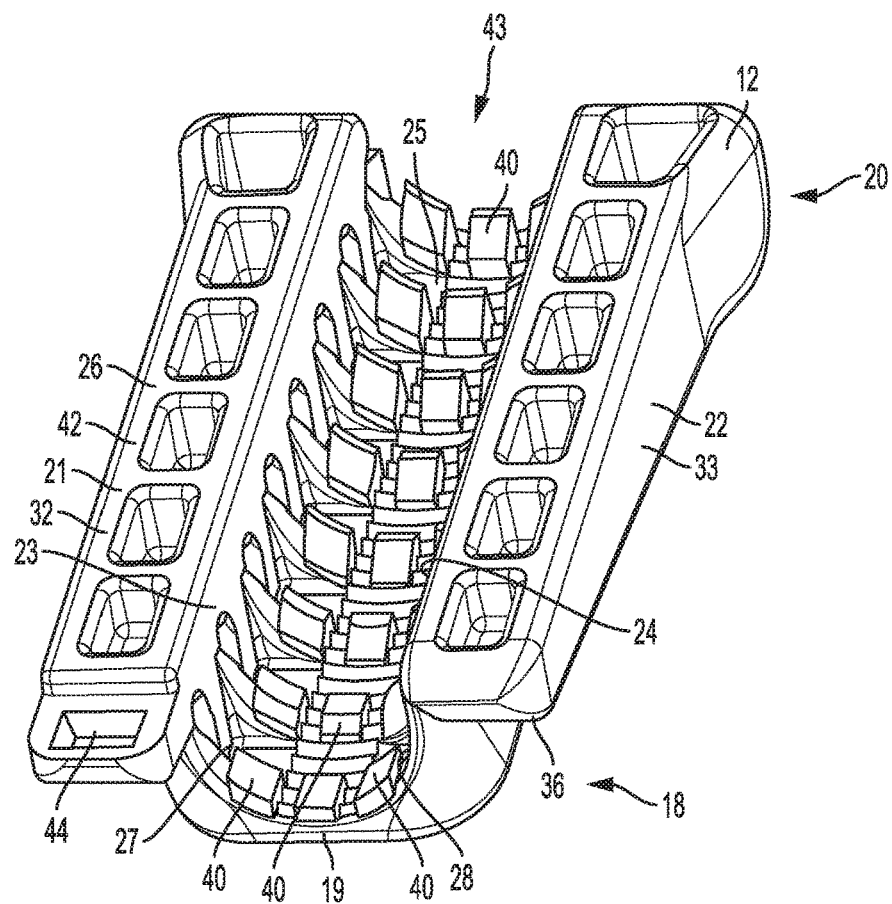
FIG. 4 is a bottom perspective view of the locking component of FIG. 1 in accordance with aspects of the present disclosure.
Figure 5:
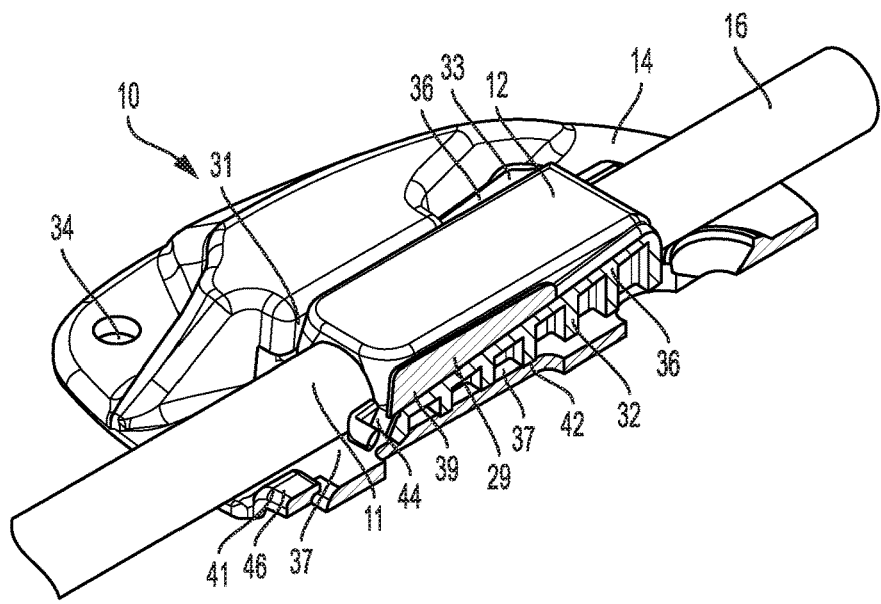
FIG. 5 is a sectional view of the mounting apparatus of FIG. 1 taken along lines 5-5 in FIG. 1 in accordance with aspects of the present disclosure.

FIG. 4 is a bottom perspective view of locking component 12 and shows many of the features of the underside of locking component 12. Locking component 12 has a front end portion 18 and a rear end portion 20, where "front" is defined as the portion that extends toward the roadway to which apparatus 10 is secured, while the "rear" is defined as the portion that extends away from the roadway to which apparatus 10 is secured. Locking component 12 includes a main portion 19 disposed between a third side portion 21 and a fourth side portion 22. In some examples, third side portion 21 and fourth side portion 22 are incorporated with main portion 19.

Main portion 19 may be generally U-shaped and configured to receive portion 11 of the road tube. For example, the main portion includes spaced-apart first and second walls 23 and 24. First wall 23 and second wall 24 may be substantially parallel to each other and each may include an end. Locking component 12 further includes a third wall 25 which connects an end 27 of first wall 23 with an end 28 of second wall 24. In use, road tube 16 is received in the cavity defined by the first, second, and third walls when the locking component engages portion 11 of the road tube. In some examples, third wall 25 is arcuate. In some examples, third wall 25 includes a plurality of teeth 40 and/or other suitable structures (e.g., bumps, protuberances, grooves, etc.) configured to engage portion 11 of road tube 16.

In other words, the first, second, and/or third walls of the locking component define a cavity or a concavity, indicated at 43, in the underside 26 of locking component 12 that is configured to receive and/or engage road tube 16. In addition to being configured to receive road tube 16, at least a portion of underside 26 of locking component 12 is configured to engage an upper surface of road tube 16, such as by frictionally engaging the upper surface of road tube 16.

At least one of the first and second side portions of base assembly 14 includes an engagement structure. For example, first side portion 15 may include a first engagement structure 29 and second side portion 17 may include a second engagement structure 31. Similarly, at least one of the third and fourth side portions of locking component 12 includes an engagement structure. For example, third side portion 23 may include a third engagement structure 32 and fourth side portion 24 may include a fourth engagement structure 33.

Each of the engagement structures may include any suitable structure configured to move locking component 12 toward base 13 as locking component 12 is moved into channel 35. In some examples, first engagement structure 29 is configured to contact third engagement structure 32, and second engagement structure 31 is configured to contact fourth engagement structure 33 when locking component 12 is received in channel 35 such that, as locking component 12 is moved into channel 35, the first and second engagement structures move locking component 12 toward base 13 to secure portion 11 of road tube 16 between the locking component and the base.

One or more the engagement structures may include inclined surfaces and/or inclined planes. In some examples, at least one of the third and fourth engagement structures is an inclined surface. For example, locking component 12 may include at least one inclined surface 36 that increases in height from front end portion 18 of locking component 12 to rear end portion 20 of locking component 12. In some examples, both third engagement structure 32 and fourth engagement structure 33 include inclined surfaces 36. In other words, locking component 12 may include two inclined surfaces 36 disposed one on each side of locking component 12.

In some examples, at least one of the first and second engagement structures is an inverted inclined surface 39 that is complementary to inclined surface 36 of the at least one of the third and fourth engagement structures such that, as locking component 12 is moved into channel 35, inverted inclined surfaces 39 move locking component 12 toward base 13 to secure portion 11 of road tube 16 therebetween. For example, and as shown in FIG. 2, channel 35 of base assembly 14 may include an inverted inclined surface 39 that is complementary to and configured to engage with the inclined surface 36 of locking component 12. Inverted inclined surface 39 and inclined surface 36 are disposed and arranged so that inverted inclined surface 39 is above inclined surface 36. During forward movement of locking component 12 within channel 35, the interaction of inverted inclined surface 39 and inclined surface 36 serves to urge locking component 12 downward, which compresses and more securely retains road tube 16 in the space between underside 26 of locking component 12 and a floor 37 of the channel 35.

As shown in FIGS. 1 through 3, disclosed apparatus 10 includes two inclined surfaces 36 disposed on the sides of locking component 12, and each side of the channel 35 includes a corresponding inverted inclined surface 39 that is complementary to the corresponding inclined surface 36 of locking component 12. In other words, the first and second engagement structures are inverted inclined surfaces 39 that are complementary to inclined surfaces 36 of the third and fourth engagement structures such that, as locking component 12 is moved into channel 35, inverted inclined surfaces 39 move locking component 12 toward base 13 to secure portion 11 of road tube 16 between the locking component and the base.

Apparatus 10 may be configured so that the forward movement of locking component 12 in channel 35 of base assembly 14 is limited. As shown in FIGS. 6 and 7 a gap exists between bottom 42 of locking component 12 and floor 37. Locking component 12 and base assembly 14 may include features configured to limit the forward motion of locking component 12 such that the compression of portion 11 of road tube 16 is limited and locking component 12 does not contact base 13. In some examples, first engagement structure 29 and second engagement structure 31 are configured such that, as locking component 12 is moved into channel 35, locking component 12 contacts base 13 to limit compression of portion 11 of road tube 16.

In some examples, base assembly 14 includes at least one stop 41 attached to, or incorporated with, planar base 13. Stop 41 may be configured such that, as locking component 12 is moved into channel 35, locking component 12 contacts stop 41 to limit compression of portion 11 of road tube 16. FIGS. 6 and 7 depict road tube 16 secured between locking component 12 and base assembly 14. In FIG. 6, locking component 12 does not contact stop 41 or base 13. In FIG. 7, road tube 16 is compressed further than in FIG. 6 and locking component 12 contacts stop 41. In the embodiment shown in FIGS. 6 and 7, locking component 12 does not contact base assembly 14. It should be appreciated that when locking component 12 contacts stop 41, no further forward movement may be permitted. In this way, a maximum degree of compression of road tube 16 is permitted, to ensure that the road tube is not fully compressed, and that changes in air pressure in the road tube can be detected by a sensor device.

In one aspect of the disclosed apparatus as shown in FIGS. 2-4, one or both of floor 37 of channel 35 and underside 26 of locking component 12 may include a plurality of features configured to enhance the frictional retention of road tube 16 between locking component 12 and base assembly 14. For example, a plurality of teeth 38 disposed on floor 37 in combination with a plurality of teeth 40 on underside 26 of locking component 12 may tightly secure road tube 16, particularly when the interaction of locking component 12 and base assembly 14 urges the locking component downward to sandwich road tube 16 therebetween. In other words, floor 37 includes plurality of teeth 38 configured to grip portion 11 of road tube 16 and third wall 25 includes plurality of teeth 40 to engage portion 11 of road tube 16. In some examples, plurality of teeth 38 includes a plurality of arcuate ribs and plurality of teeth 40 includes a plurality of arcuate ridges.

Although the disclosed apparatus features ribs 38 and ridges 40, it should be appreciated that any number of different retention structures could be employed for this purpose, such as arrays of scales, teeth, protuberances, projections, bumps, or pegs, and the like. Alternatively, floor 37 of channel 35 and underside 26 of locking component 12 may be substantially smooth, and rely instead upon a high coefficient of friction between the material of road tube 16 and the material of apparatus 10.

FIG. 1 depicts road tube mounting apparatus 10 of the present disclosure having road tube 16 inserted into channel 35 and secured beneath locking component 12. Due to the interaction of inclined surfaces 36 and inverted inclined surfaces 39 of mounting apparatus 10, when the road tube is placed under tension, locking component 12 is urged forward and road tube 16 becomes held even more securely.

However, despite the secure hold provided by the disclosed apparatus, a user need only urge locking component 12 rearward to completely disengage locking component 12 from base assembly 14, and thereby free road tube 16 from mounting apparatus 10.

As discussed, locking component 12 can be easily removed from base assembly 14 by simply urging the wedge component rearward and disengaging it from base assembly 14. However, apparatus 10 and road tube 16 may be placed in a location that is not under observation and the apparatus may incorporate one or more security features. Typically, apparatus 10 may incorporate complementary features disposed on both wedge component 12 and base assembly 14 that may act cooperatively to secure the wedge component in place.

In some examples, planar base 13 includes a first aperture 46 and locking component 12 includes a second aperture 44. First aperture 46 and second aperture 44 may be positioned such that those apertures are adjacent to each other when locking component 12 is received in channel 35 with portion 11 of road tube 16 between locking component 12 and base assembly 14. In some examples, first aperture 46 and second aperture 44 are sized to receive a securing cable. For example, as best seen in FIG. 1, second aperture 44 on locking component 12 may be configured to be adjacent to first aperture 46 on base assembly 14, so that by passing a securing cable through second aperture 44 and first aperture 46, locking component 12 can be secured in place. The securing cable may be any suitable cable material, including wire, woven cable, zip-ties, and the like.

In some examples, first aperture 46 and stop 41 are the same structure. In the embodiment shown in FIG. 7, second aperture 44 abuts first aperture 46 (stop 41) which limits the compression of portion 11 of road tube 16 as discussed above.

During use, the apparatus of the present disclosure may offer substantial advantages over previous methods of securing road tubes. For example, the present apparatus ensures that the amount of constraint and/or compression exerted on the road tube is limited, so that operation of the sensor is not compromised. Furthermore, a lesser and constant constriction of the road tube may cause less influence on the pressure pulse signal in general and thus be more accurate.

In addition, the disclosed apparatus permits significant flexibility in how the road tube may be installed. For example, base assembly 14 can be secured to a road surface, locking component 12 may then be coupled to road-tube 16, and then the combined locking component and road tube can be installed in base assembly 14. Alternatively, where aperture 30 is a keyhole aperture, as shown, the fastener may be driven into the desired surface first, permitting the road tube 16 to be coupled with locking component 12 and secured in apparatus 10, and then installed on the fastener. Importantly, road tube 16 can be pulled to a desired amount of tension after the base has already been secured, and then retained at that tension by coupling locking component 12 to road tube 16 and base assembly 14. Furthermore, the present apparatus facilitates the easy release or retightening of the road tube in place. Similarly, the road tube may be removed entirely without removing the base from the road surface, and quickly replaced as there is no requirement to thread the road tube through any opening.

Due to the design of the present apparatus, the road tube is secured by a large area of contact between the outer surface of the road tube and the components of the apparatus, leading to less chance of road tube failure at the clamp, compared to previous methods of mounting road tubes. In addition, the apparatus of the present disclosure may be easily sized to accommodate either of the most popular road tube diameters, approximately $9/16"$ and approximately $3/8"$ outside diameters, or be readily adapted to secure smaller or larger tubes.

It should further be appreciated that there may be any number of variations in the specific details of the locking component, the base assembly, or both, as long as the locking component and the base assembly are configured to function cooperatively to tension and retain the road tube. For example, the locking component may incorporate one or more inclined surfaces that interact with a stationary feature, such as a post or other projection on the base assembly. Contrariwise, the locking component may incorporate a post or projection that is configured to interact with an inclined surface on the base assembly.

Alternatively, or in addition, the locking component may define a conical shape that fits around the road tube, limiting compression on the tube and interacting with a conical recess in the base assembly to secure the road tube.

Alternatively, or in addition, the road tube may be secured on the base assembly by eccentric rotating cams that rotate to compress the road tube as tension is applied to the road tube, or the road tube may be clasped between the recesses at the ends of two pivoting arms that cooperatively clasp the road tube when they rotate into place, optionally locking in position. Alternatively, the road tube may be simply wedged into a gradually narrowing slot in the base.

The locking component and the base assembly can interact via a wedging interaction in a horizontal plane, or a vertical plane, without limitation, depending on the convenience of the user and the geometry of the installation.

This section describes additional aspects and features of a road tube mounting apparatus, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-Reference to Related Applications, in any suitable manner. Some of the paragraphs below expressly refer to and further limit other paragraphs, providing without limitation examples of some of the suitable combinations.

A0. A mounting apparatus for a road tube, comprising:

a wedge component having a front end and a rear end, including at least one inclined plane that increases in height from its front terminus to its rear terminus; wherein at least a portion of an underside of the wedge component is configured to engage an upper surface of the road tube; and a base configured to be secured to a roadway, the base defining a channel configured to accept the road tube and to secure the wedge component atop the road tube in the channel; wherein the channel includes an inverted inclined plane that is complementary to and configured to engage with the inclined plane of the wedge component so that a forward movement of the wedge component within the channel urges the wedge component downward and thereby compresses and more securely retains the road tube between the underside of the wedge component and a floor of the channel.

A1. The mounting apparatus of paragraph A0, wherein the wedge component includes two inclined planes disposed on the sides of the wedge component, and each side of the channel defined by the base includes an inverted inclined plane that is complementary to the corresponding inclined plane of the wedge component.

A2. The mounting apparatus of any of paragraphs A0-A1, wherein the floor of the channel includes one or more features configured to increase friction with the road tube.

A3. The mounting apparatus of paragraph A2, wherein the one or more features include a plurality of arcuate ridges.

A4. The mounting apparatus of any of paragraphs A0-A3, wherein the underside of the wedge component includes one or more features configured to increase friction with the road tube.

A5. The mounting apparatus of paragraph A4, wherein the one or more features include a plurality of ridges.

A6. The mounting apparatus of any of paragraphs A0-A5, wherein the base is configured to be secured to a road surface via a fastener.

A7. The mounting apparatus of paragraph A6, wherein the base is configured to pivot around the fastener securing the base to the road surface.

A8. The mounting apparatus of any of paragraphs A0-A7, wherein the base and the wedge component are configured so that forward movement of the wedge component in the channel is limited in order to create a minimum degree of compression of the road tube.

A9. The mounting apparatus of any of paragraphs A0-A8, further comprising one or more complementary features on the wedge component and the base configured to facilitate securing the wedge to the base.

A10. The mounting apparatus of paragraph A9, wherein the one or more complementary features include apertures configured to receive a securing cable.

B0. An apparatus for securing a road tube to a roadway, comprising:
a locking component configured to engage a portion of the road tube; and
a base assembly configured to be secured to the roadway, the base assembly including a planar base, a first side portion extending from the base, and a second side portion extending from the base, the first and second side portions defining a channel therebetween, the channel is configured to receive the locking component and, as the locking component is moved into the channel, at least one of the first and second side portions are configured to move the locking component toward the base to secure the portion of the road tube therebetween.

B1. The apparatus of paragraph B0, wherein the locking component includes a main portion disposed between third and fourth side portions.

B2. The apparatus of any of paragraphs B0-B1, wherein the main portion is generally U-shaped and is configured to receive the portion of the road tube.

B3. The apparatus of any of paragraphs B1-B2, wherein the main portion includes spaced-apart first and second walls, the first and second walls are parallel to each other and each of the first and second walls includes an end, the locking component further includes a third wall connecting the ends of the first and second walls, wherein the first, second, and third walls define a cavity that is configured to receive the portion of the road tube.

B4. The apparatus of paragraph B3, wherein the third wall is arcuate.

B5. The apparatus of any of paragraphs B3-B4, wherein the third wall includes a plurality of teeth to engage the portion of the road tube.

B6. The apparatus of any of paragraphs B1-B5, wherein at least one of the first and second portions of the base assembly includes an engagement structure, and wherein at least one of the third and fourth side portions of the locking component includes an engagement structure.

B7. The apparatus of any of paragraphs B1-B5, wherein the first and second portions of the base assembly include first and second engagement structures, respectively, wherein the third and fourth side portions of the locking component include third and fourth engagement structures, respectively.

B8. The apparatus of paragraph B7, wherein the first engagement structure is configured to contact the third engagement structure, and the second engagement structure is configured to contact the fourth engagement structure when the locking component is received in the channel such that, as the locking component is moved into the channel, the first and second engagement structures move the locking component toward the base to secure the portion of the road tube therebetween.

B9. The apparatus of any of paragraphs B7-B8, wherein at least one of the third and fourth engagement structures is an inclined surface.

B10. The apparatus of paragraph B9, wherein at least one of the first and second engagement structures is an inverted inclined surface that is complementary to the inclined surface of the at least one of the third and fourth engagement structures such that, as the locking component is moved into the channel, the inverted inclined surfaces move the locking component toward the base to secure the portion of the road tube therebetween.

B11. The apparatus of any of paragraphs B9-B10, wherein the locking component includes a front end portion and a rear end portion, and wherein the inclined surface increases in height from the front end portion to the rear end portion.

B12. The apparatus of paragraph B8, wherein the third and fourth engagement structures are inclined surfaces.

B13. The apparatus of paragraph B12, wherein the first and second engagement structures are inverted inclined surfaces that are complementary to the inclined surfaces of the third and fourth engagement structures such that, as the locking component is moved into the channel, the inverted inclined surfaces move the locking component toward the base to secure the portion of the road tube therebetween.

B14. The apparatus of any of paragraph B12-B13, wherein the locking element includes a front end portion and a rear end portion, and wherein the inclined surfaces increase in height from the front end portion to the rear end portion.

B15. The apparatus of any of paragraphs B7-B14, wherein the first and second engagement structures are configured such that, as the locking component is moved into the channel, the locking component contacts the base to limit compression of the portion of the road tube.

B16. The apparatus of any of paragraphs B1-B15, wherein the third and fourth side portions are incorporated with the main portion.

B17. The apparatus of any of paragraphs B0-B16, wherein the planar base includes a floor such that the first side portion, the second side portion, and the floor define the channel.

B18. The apparatus of paragraph B17, wherein the floor includes a plurality of teeth configured to grip the portion of the road tube.

B19. The apparatus of any of paragraphs B0-B18, wherein the base assembly includes at least one stop attached to, or incorporated with, the planar base, the stop configured such that, as the locking component is moved into the channel, the locking component contacts the stop to limit compression of the portion of the road tube.

B20. The apparatus of any of paragraphs B0-B19, wherein the planar base includes a first aperture and the locking component includes a second aperture, the first and second apertures are positioned such that those apertures are adjacent to each other when the locking component is received in the channel with the portion of the road tube between the locking component and the base assembly.

B21. The apparatus of paragraph B20, wherein the first and second apertures are sized to receive a securing cable.

B22. The apparatus of any of paragraphs B0-B21, wherein the first and second side portions are incorporated with the base.

B23. The apparatus of any of paragraphs B0-B22, wherein the locking component is wedge-shaped.

B24. The apparatus of any of paragraphs B0-B23, wherein the planar base includes an aperture sized to receive a fastener to secure the base assembly to the roadway.

C0. An apparatus for securing a road tube to a roadway, comprising:
a locking component configured to engage a portion of the road tube, the locking component includes a main portion disposed between third and fourth side portions, wherein the main portion includes spaced-apart first and second walls, the first and second walls are parallel to each other and each of the first and second walls includes an end, the locking component further includes a third wall connecting the ends of the first and second walls, wherein the first, second, and third walls define a cavity that is configured to receive the portion of the road tube; and
a base assembly configured to be secured to the roadway, the base assembly including a planar base, a first side portion extending from the base, and a second side portion extending from the base, the first and second side portions defining a channel therebetween, the channel is configured to receive the locking component and, as the locking component is moved into the channel, at least one of the first and second side portions are configured to move the locking component toward the base to secure the portion of the road tube therebetween.

C1. The apparatus of paragraph C0, wherein the third wall is arcuate.

C2. The apparatus of any of paragraphs C0-C1, wherein the third wall includes a plurality of teeth to engage the portion of the road tube.

C3. The apparatus of any of paragraphs C0-C2, wherein the first and second portions of the base assembly include first and second engagement structures, respectively, wherein the third and fourth side portions of the locking component include third and fourth engagement structures, respectively.

C4. The apparatus of paragraph C3, wherein the first engagement structure is configured to contact the third engagement structure, and the second engagement structure is configured to contact the fourth engagement structure when the locking component is received in the channel such that, as the locking component is moved into the channel, the first and second engagement structures move the locking component toward the base to secure the portion of the road tube therebetween.

C5. The apparatus of paragraph C4, wherein the third and fourth engagement structures are inclined surfaces.

C6. The apparatus of paragraph C5, wherein the first and second engagement structures are inverted inclined surfaces that are complementary to the inclined surfaces of the third and fourth engagement structures such that, as the locking component is moved into the channel, the inverted inclined surfaces move the locking component toward the base to secure the portion of the road tube therebetween.

D0. An apparatus for securing a road tube to a roadway, comprising:
a locking component configured to engage a portion of the road tube, the locking component includes a main portion disposed between third and fourth side portions, wherein the main portion includes spaced-apart first and second walls, the first and second walls are parallel to each other and each of the first and second walls includes an end, the locking component further includes a third wall connecting the ends of the first and second walls, wherein the first, second, and third walls define a cavity that is configured to receive the portion of the road tube; and
a base assembly configured to be secured to the roadway, the base assembly including a planar base, a first side portion extending from the base, and a second side portion extending from the base, the first and second side portions defining a channel therebetween, the channel is configured to receive the locking component and, as the locking component is moved into the channel, at least one of the first and second side portions are configured to move the locking component toward the base to secure the portion of the road tube therebetween, wherein the first and second portions of the base assembly include first and second inverted inclined surfaces, respectively, wherein the third and fourth side portions of the locking component include third and fourth inclined surfaces, respectively, the first inverted inclined surface is configured to contact the third inclined surface, and the second inverted inclined surface is configured to contact the fourth inclined surface when the locking component is received in the channel such that, as the locking component is moved into the channel, the first and second inverted inclined surfaces are configured to move the locking component toward the base to secure the portion of the road tube therebetween.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

The specific embodiments of the present apparatus as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the disclosure recites "a" or "a first" element or the equivalent thereof, such disclosure should be understood to include incorporation of one or more such elements, neither requiring nor excluding two or more such elements.

Various combinations and subcombinations of features, functions, elements, and/or properties may be claimed through presentation of a related application. Such new claims, whether they are directed to a different invention or directed to the same invention, whether different, broader, narrower or equal in scope to the original claims, are also regarded as included within the subject matter of the present disclosure.

What is claimed is:
1. An apparatus for securing a road tube to a roadway, comprising:
a locking component configured to engage a portion of the road tube; and a base assembly configured to be secured to the roadway, the base assembly including a planar base, a first side portion extending from the base, and a second side portion extending from the base, the first and second side portions defining a channel therebetween, the channel is configured to receive the locking component and, as the locking component is moved into the channel, at least one of the first and second side portions are configured to move the locking component toward the base to secure the portion of the road tube therebetween, wherein the planar base includes a floor such that the first side portion, the second side portion, and the floor define the channel, and wherein the floor includes a plurality of teeth configured to grip the portion of the road tube.

2. The apparatus of claim 1, wherein the locking component includes a main portion disposed between third and fourth side portions.

3. The apparatus of claim 2, wherein the main portion includes spaced-apart first and second walls, the first and second walls are parallel to each other and each of the first and second walls includes an end, the locking component further includes a third wall connecting the ends of the first and second walls, wherein the first, second, and third walls define a cavity that is configured to receive the portion of the road tube.

4. The apparatus of claim 3, wherein the third wall includes a plurality of teeth to engage the portion of the road tube.

5. The apparatus of claim 2, wherein at least one of the first and second portions of the base assembly includes an engagement structure, and wherein at least one of the third and fourth side portions of the locking component includes an engagement structure.

6. The apparatus of claim 2, wherein the first and second portions of the base assembly include first and second engagement structures, respectively, wherein the third and fourth side portions of the locking component include third and fourth engagement structures, respectively.

7. An apparatus for securing a road tube to a roadway, comprising:
a locking component configured to engage a portion of the road tube; and
a base assembly configured to be secured to the roadway, the base assembly including a planar base, a first side portion extending from the base, and a second side portion extending from the base, the first and second side portions defining a channel therebetween, the channel is configured to receive the locking component and, as the locking component is moved into the channel, at least one of the first and second side portions are configured to move the locking component toward the base to secure the portion of the road tube therebetween, wherein the locking component includes a main portion disposed between third and fourth side portions, wherein the first and second portions of the base assembly include first and second engagement structures, respectively, wherein the third and fourth side portions of the locking component include third and fourth engagement structures, respectively,
wherein the first engagement structure is configured to contact the third engagement structure, and the second engagement structure is configured to contact the fourth engagement structure when the locking component is received in the channel such that, as the locking component is moved into the channel, the first and second engagement structures move the locking component toward the base to secure the portion of the road tube therebetween.

8. The apparatus of claim 7, wherein at least one of the third and fourth engagement structures is an inclined surface.

9. The apparatus of claim 8, wherein at least one of the first and second engagement structures is an inverted inclined surface that is complementary to the inclined surface of the at least one of the third and fourth engagement structures such that, as the locking component is moved into the channel, the inverted inclined surface move the locking component toward the base to secure the portion of the road tube therebetween.

10. The apparatus of claim 7, wherein the third and fourth engagement structures are inclined surfaces.

11. The apparatus of claim 10, wherein the first and second engagement structures are inverted inclined surfaces that are complementary to the inclined surfaces of the third and fourth engagement structures such that, as the locking component is moved into the channel, the inverted inclined surfaces move the locking component toward the base to secure the portion of the road tube therebetween.

12. The apparatus of claim 7, wherein the first and second engagement structures are configured such that, as the locking component is moved into the channel, the locking component contacts the base to limit compression of the portion of the road tube.

13. The apparatus of claim 2, wherein the third and fourth side portions are formed with the main portion.

14. The apparatus of claim 1, wherein the base assembly includes at least one stop attached to, or formed with, the planar base, the at least one stop is configured such that, as the locking component is moved into the channel, the locking component contacts the at least one stop to limit compression of the portion of the road tube.

15. The apparatus of claim 1, wherein the first and second side portions are formed with the base.

16. An apparatus for securing a road tube to a roadway, comprising:
a locking component configured to engage a portion of the road tube, the locking component includes a main portion disposed between third and fourth side portions, wherein the main portion includes spaced-apart first and second walls, the first and second walls are parallel to each other and each of the first and second walls includes an end, the locking component further includes a third wall connecting the ends of the first and second walls, wherein the first, second, and third walls define a cavity that is configured to receive the portion of the road tube; and
a base assembly configured to be secured to the roadway, the base assembly including a planar base, a first side portion extending from the base, and a second side portion extending from the base, the first and second side portions defining a channel therebetween, the channel is configured to receive the locking component and, as the locking component is moved into the channel, at least one of the first and second side portions are configured to move the locking component toward the base to secure the portion of the road tube therebetween, wherein the third wall is arcuate and includes a plurality of teeth to engage the portion of the road tube.

17. An apparatus for securing a road tube to a roadway, comprising:

a locking component configured to engage a portion of the road tube, the locking component includes a main portion disposed between third and fourth side portions, wherein the main portion includes spaced-apart first and second walls, the first and second walls are parallel to each other and each of the first and second walls includes an end, the locking component further includes a third wall connecting the ends of the first and second walls, wherein the first, second, and third walls define a cavity that is configured to receive the portion of the road tube; and a base assembly configured to be secured to the roadway, the base assembly including a planar base, a first side portion extending from the base, and a second side portion extending from the base, the first and second side portions defining a channel therebetween, the channel is configured to receive the locking component and, as the locking component is moved into the channel, at least one of the first and second side portions are configured to move the locking component toward the base to secure the portion of the road tube therebetween, wherein the first and second portions of the base assembly include first and second inverted inclined surfaces, respectively, wherein the third and fourth side portions of the locking component include third and fourth inclined surfaces, respectively, the first inverted inclined surface is configured to contact the third inclined surface, and the second inverted inclined surface is configured to contact the fourth inclined surface when the locking component is received in the channel such that, as the locking component is moved into the channel, the first and second inverted inclined surfaces move the locking component toward the base to secure the portion of the road tube therebetween.

\* \* \* \* \*